United States Patent
Halme et al.

(10) Patent No.: US 10,753,343 B2
(45) Date of Patent: Aug. 25, 2020

(54) HEAT EXCHANGER FOR AN ELECTRICAL MACHINE

(71) Applicant: ABB Schweiz AG, Baden (CH)

(72) Inventors: Matti Halme, Espoo (FI); Martti Toivonen, Helsinki (FI); Hannu Kurkinen, Helsinki (FI); Veikko Haverinen, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/206,101

(22) Filed: Nov. 30, 2018

(65) Prior Publication Data
US 2019/0101105 A1    Apr. 4, 2019

Related U.S. Application Data

(63) Continuation of application No. PCT/EP2017/062984, filed on May 30, 2017.

(30) Foreign Application Priority Data

May 30, 2016    (CN) .......................... 2016 1 0371050

(51) Int. Cl.
  *H02K 9/00* (2006.01)
  *F03D 80/60* (2016.01)
  (Continued)

(52) U.S. Cl.
  CPC ............... *F03D 80/60* (2016.05); *F03D 9/25* (2016.05); *F28D 1/024* (2013.01);
  (Continued)

(58) Field of Classification Search
  CPC ... F28D 1/02; F28D 7/16; F28D 1/053; F28D 1/05308; F28D 1/024; F28D 2001/0266;
  (Continued)

(56) References Cited

U.S. PATENT DOCUMENTS 7,057,305 B2 * 6/2006 Kruger-Gotzmann ............
  H02K 7/1823
  290/55
2004/0222711 A1 * 11/2004 Klimt ...................... H02K 9/18
  310/59
(Continued)

FOREIGN PATENT DOCUMENTS

DE    4213509 A1    10/1993
DE    102006024342 A1    11/2007
FR    2771481 A1    5/1999

OTHER PUBLICATIONS

Machine Translation for DE 102006024342 Dec. 27, 2019.*
(Continued)

*Primary Examiner* — Naishadh N Desai
(74) *Attorney, Agent, or Firm* — Taft Stettinius & Hollister LLP; J. Bruce Schelkopf

(57) ABSTRACT

The invention relates to a heat exchanger for an electrical machine. The heat exchanger comprises a housing and a tube bundle. The tube bundle comprises a plurality of tubes within the housing extending between a first end and a second end of the housing in the direction of the length of the heat exchanger. The housing comprises a top wall, end walls extending in the direction of the width of the heat exchanger and first and second side walls extending in the direction of the length of the heat exchanger and a bottom frame. Between a first side wall of the housing and a side of the tube bundle is a mounting space for receiving one or more cooling fluid circulating devices.

19 Claims, 2 Drawing Sheets

(51) Int. Cl.
*F28D 7/16* (2006.01)
*F03D 9/25* (2016.01)
*F28D 1/02* (2006.01)
*F28D 1/053* (2006.01)
*H02K 9/04* (2006.01)
*H02K 9/18* (2006.01)

(52) U.S. Cl.
CPC ........... *F28D 1/05308* (2013.01); *F28D 7/16* (2013.01); *H02K 9/04* (2013.01); *H02K 9/18* (2013.01); *F05B 2220/30* (2013.01); *F05B 2220/64* (2013.01); *F05B 2260/20* (2013.01); *F28D 2001/0266* (2013.01); *F28F 2250/08* (2013.01); *Y02E 10/726* (2013.01); *Y02P 70/523* (2015.11)

(58) Field of Classification Search
CPC .. H02K 9/04; H02K 9/18; F03D 80/60; F03D 9/25; Y02P 70/523; F05B 2220/30; F05B 2260/20; F05B 2220/64; Y02E 10/726; F28F 2250/08
USPC ....................... 310/52, 54, 58, 61, 62, 63, 64
See application file for complete search history.

(56) References Cited

U.S. PATENT DOCUMENTS

| | | | |
|---|---|---|---|
| 2005/0067153 A1* | 3/2005 | Wu ........................... | F28D 7/16 165/158 |
| 2010/0193167 A1* | 8/2010 | Song ........................ | F28D 7/16 165/159 |
| 2011/0000640 A1 | 1/2011 | Jensen | |
| 2011/0132575 A1* | 6/2011 | Goodson .................. | B08B 3/12 165/95 |
| 2015/0144308 A1* | 5/2015 | Donovan .................. | F28F 9/22 165/109.1 |

OTHER PUBLICATIONS

European Patent Office, International Search Report & Written Opinion issued in corresponding Application No. PCT/EP2017/062984, dated Aug. 21, 2017, 9 pp.

* cited by examiner

HEAT EXCHANGER FOR AN ELECTRICAL MACHINE

FIELD OF THE INVENTION

The invention relates to a heat exchanger for an electrical machine.

BACKGROUND OF THE INVENTION

An electrical machine generates heat in its various parts because of mechanical losses, magnetic losses and electrical losses. This excess heat has to be removed. The heat is often transferred to a cooling fluid which is circulated in the electrical machine and then cooled in a separate cooling unit after which it is returned back to the electrical machine.

In applications like wind turbine generator systems the space is precious. A wind turbine nacelle has compact dimensions and place requirements on the size of the cooling unit and its heat exchangers.

A heat exchanger for cooling an electrical machine is typically installed on the top of the electrical machine increasing the total height of the wind turbine generator. The cooling fluid circulation of the electrical machine needs often also fans or pumps to enhance the cooling fluid circulation in the heat exchanger. These fans or pumps also increase the required free height in the nacelle.

The drawback with the previous solutions in a heat exchanger for the electrical machine is its requirements for the space and the free height.

BRIEF DESCRIPTION OF THE INVENTION

An object of the present invention is to solve the above mentioned drawbacks and to provide a compact heat exchanger for an electrical machine.

This object is achieved with a heat exchanger according to independent claim 1.

A heat exchanger for an electrical machine comprises a housing and a tube bundle. The tube bundle comprises a plurality of tubes within the housing extending between a first end and a second end of the housing in the direction of the length of the heat exchanger. The housing comprises a top wall, end walls extending in the direction of the width of the heat exchanger and first and second side walls extending in the direction of the length of the heat exchanger and a bottom frame. Between a first side wall of the housing and a side wall of the tube bundle is a mounting space extending from the first end to the second end of the housing, a first fan being positioned in the mounting space adjacent to the first end of the housing and a second fan being positioned in the mounting space adjacent to the second end of the housing.

An advantage of the invention is that it reduces the required space and the free height for the heat exchanger.

Some preferred embodiments of the invention are disclosed in the dependent claims.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
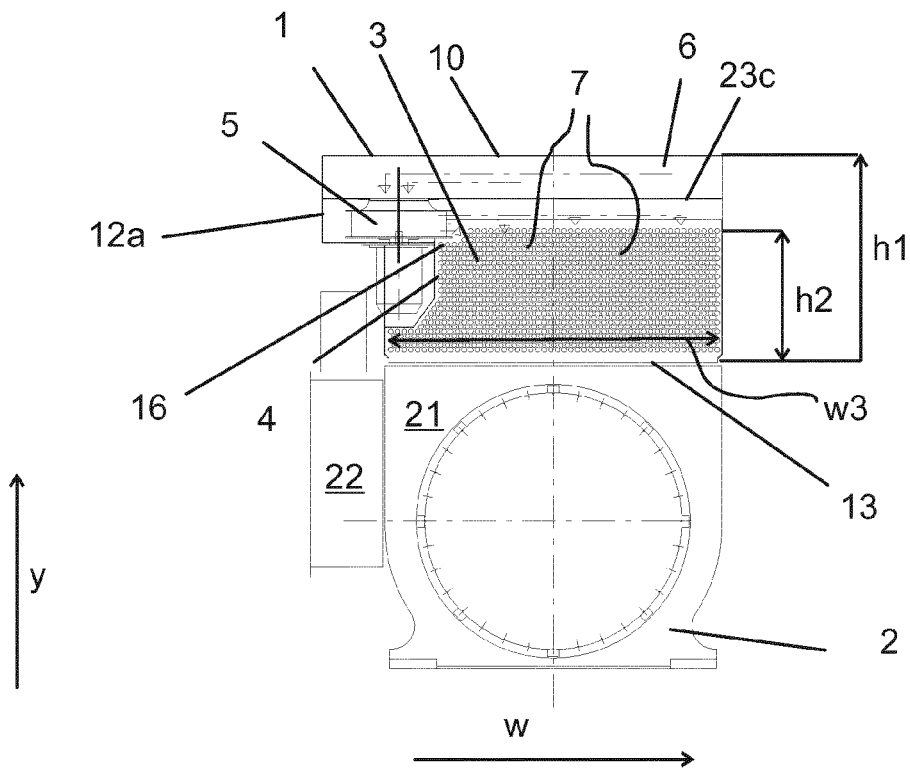
FIG. 1 shows an end view of a heat exchanger connected to an electrical machine.

FIG. 1 shows an end view of a heat exchanger 1 connected to an electrical machine 2. In the FIG. 1 the end wall of the heat exchanger is removed in order to better illustrate the arrangement of a tube bundle 3, a mounting space 4 and a cooling fluid circulating device 5 within the heat exchanger housing 6.

The heat exchanger 1 comprises a housing 6 and a tube bundle 3. The tube bundle 3 comprises a plurality of tubes 7 within the housing 6 extending between a first end 8 and a second end 9 of the housing 6 in the direction of the length of the heat exchanger L. The outer surface of a tube can be finned, for instance, for enhancing the heat transfer between the tube surface and a cooling fluid flowing over the tube surface. The housing 6 comprises a top wall 10, end walls 11 extending in the direction of the width w of the heat exchanger and first 12a and second side walls 12b extending in the direction of the length of the heat exchanger L and a bottom frame 13. The cooling fluid 14, i.e. the internal cooling fluid 14, flowing in the housing over the plurality of tubes 7 enters and exits through the bottom frame 13 through one or more openings formed in the bottom frame. The external cooling fluid 15 flowing in the plurality of tubes 7 enters through a first end wall 11a and exits through a second end wall 11b through one or more openings.

Between a first side wall of the housing 12a and the side of tube bundle 16 is a mounting space 4. The mounting space extends from the first end 8 to the second end of the heat exchanger 9. In the FIG. 1 the width of the tube bundle w3 is wider in the region closer to the bottom frame 13 than the width of the tube bundle w3 in a region closer to the top wall 10 creating a mounting space 17 between a first side wall of the housing 12a and a side of the tube bundle 16. However, the width of the tube bundle w3 may remain also constant or vary in the height direction. The tube bundle 3 preferably extends to the second side wall 12b of the heat exchanger 1 in order maximize the heat transfer surface of the plurality of tubes 7 within the housing 6.

The vertically lower part of the mounting space 4 is abutted on the plurality of the tubes 7 and the first side wall 12a. The tube bundle 3 extends to the first side wall 12a below the vertically lower part of the mounting space 4 in the width direction w. It is also possible that the tube bundle 3 does not extend to the first side wall 12a below the vertically lower part of the mounting space 4 in the width direction w leaving the lower part of mounting space 4 open towards the bottom frame 13.

The mounting space 4 may comprise one or more mounting spots 17 of a cooling fluid circulating device 5 having mounting faces for the cooling fluid circulating devices 5.

The height of the tube bundle h2 is less than the internal height of the housing h1. The height of the tube bundle h2 is preferably 50-80% of the internal height of the housing h1 in vertical direction y. The height of the tube bundle h2 may also be arranged to extend to the horizontal baffle 23c. The upper part of the heat exchanger 1 is left without plurality of tubes 7 arranged in rows in order to create a free passage for the cooling fluid 14 in the length direction of the heat exchanger L to reach one or more cooling fluid circulating device 5.

The width of the housing may be 5-25% greater in the top wall region w2 than the width of the housing in the bottom frame region w1. The greater width of the housing on the first side wall 12a side of the housing 6 in the upper part of the heat exchanger 1 provides more space for installing one or more cooling fluid circulating devices 5. In the figures the fan wheel 19 is placed to the top wall region having greater width of 8-15% and the fan motor 20 is placed to the middle region having a smaller width of the housing w than in the top wall 10 region.

The cooling fluids 14, 15 used for an electrical machine 2 for heat exchange are typically gaseous and/or liquid, e.g. air and water. Electrical machines 2 used as wind turbine generators use often air as the cooling fluid 14 within the electrical machine, i.e. in the internal circulation, and air or water as an external cooling fluid 15 in the external circulation which cools down the air of internal circulation. Then the cooling fluid 14 flowing over the tubes within the housing is gaseous and the external cooling fluid 15 flowing inside the tubes is gaseous or liquid. In the heat exchanger 1 the cooling fluid 14 transfers heat to the external cooling fluid 15 through the tube walls and cools down.

The cooling fluid circulating device 5 can comprise a fan 18, for instance. In the figures the cooling fluid circulating device 5 comprises a fan 18 comprising a fan motor 20 and a fan wheel 19. The fan 18 is mounted in the mounting space 4 and a fan wheel 19 of the fan is positioned above the fan motor 20 in vertical direction y. The inlet of the fan wheel 19 is above the plurality of the tubes 7 in vertical direction y. The fan wheel 19 can be linked directly to the shaft of an electric motor 20.

The heat exchanger 1 may be installed on the top of an electrical machine 2. The electrical machine 2 shown has a symmetrical cooling fluid circulation where the cooling fluid enters to the electrical machine 2 from its both ends and in the electrical machine heated cooling fluid exits from the middle part of the electrical machine 2. The heat exchanger 1 is attached to a frame of the electrical machine 21 by means of the bottom frame 13.

The electrical machine may comprise a side mounted terminal box 22 on a frame of the electrical machine 21. Then the terminal box 22 and the first side wall of the heat exchanger 12a are preferably on the same side of the assembly of the electrical machine 2 and the heat exchanger 1. This arrangement is advantageous as the maintenance and possible replacement of the cooling fluid circulating devices 5 can be performed using the same catwalks and other structures provided for the terminal box 22.

Figure 2:
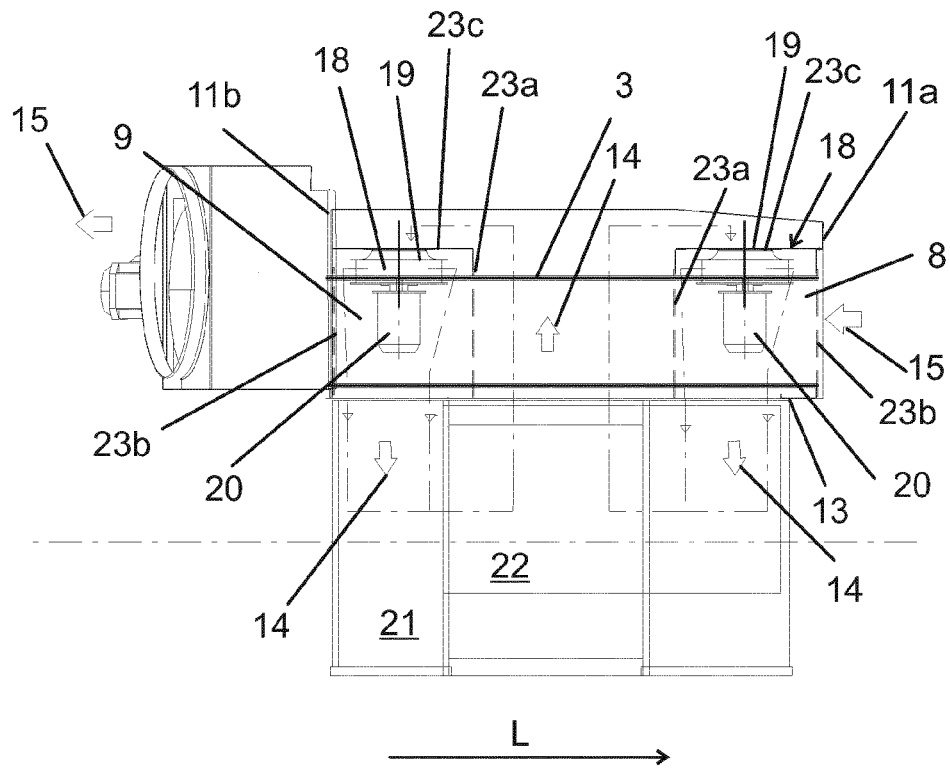
FIG. 2 shows a side view of the heat exchanger connected to an electrical machine.

FIG. 2 shows a side view of the heat exchanger 1 connected to an electrical machine 2. The heat exchanger 1 is shown with the first side wall 12a removed and the tube bundle 3 is presented as a transparent square for the sake of clarity.

The heat exchanger 1 comprises baffles 23a-c within the housing which divide the heat exchanger into sections. The baffles 23a-c can be designed also to support the tubes but the baffles 23a-c may only be used as a cooling fluid flow 14 directors. The baffles 23a-c are arranged to form fluid channels for the cooling fluid flow 14.

The heat exchanger shown in FIG. 2 comprises baffles 23a-b spaced at a distance apart from each other in the length direction of the heat exchanger L. Two inlet baffles 23a are located between two mounting spots 17, i.e. between the cooling fluid circulating devices 5, forming a cooling fluid inlet flow channel in the middle part of the heat exchanger 1. The cooling fluid inlet flow channel extends from the bottom frame 13 to above the plurality of the tubes 7.

Two outlet baffles 23b are located on the sides of the two mounting spots 17, i.e. between the cooling fluid circulating devices 5, facing the first 8 and second end 9 of the heat exchanger 1. The inlet baffles 23a in the middle part of the heat exchanger 1 and the outlet baffles 23b at the first end 8 part region and the second end 9 part region of the heat exchanger 1 form cooling fluid outlet flow channels in the vertical direction of the heat exchanger y.

Above a mounting spot 17 is a horizontal baffle 23c with an opening for the cooling fluid flow 14. The horizontal baffle 23c and the top wall 10 form a cooling fluid channel in the length direction of the heat exchanger L. The horizontal baffle 23c extends preferably between the first 12a and second side 12b walls and is attached to an inlet 23a and outlet baffle 23b creating a cover to the cooling fluid outlet flow channel.

The small and big arrows indicate the flow direction of the cooling fluid 14. The fan 18 is configured to suck the cooling fluid 14 through the cooling fluid inlet flow channel formed in the middle part of the heat exchanger 1. The cooling fluid 14 cools in the inlet flow channel as it flows over the plurality of tubes 7. The cooling fluid 14 is further sucked through the cooling fluid channels in the length direction of the heat exchanger L in the upper part of the heat exchanger 1 towards the ends of the housing 8, 9. The cooling fluid 14 enters then to the fan wheel 19 via its inlet and is pushed through the cooling fluid outlet flow channels formed at the first end 8 part region and the second end 9 part region of the heat exchanger 1.

The outlet of the fan wheel 19 may be configured to blow the cooling fluid 14 towards the tube bundle 3 in the width direction of the tube bundle w.

Figure 3:
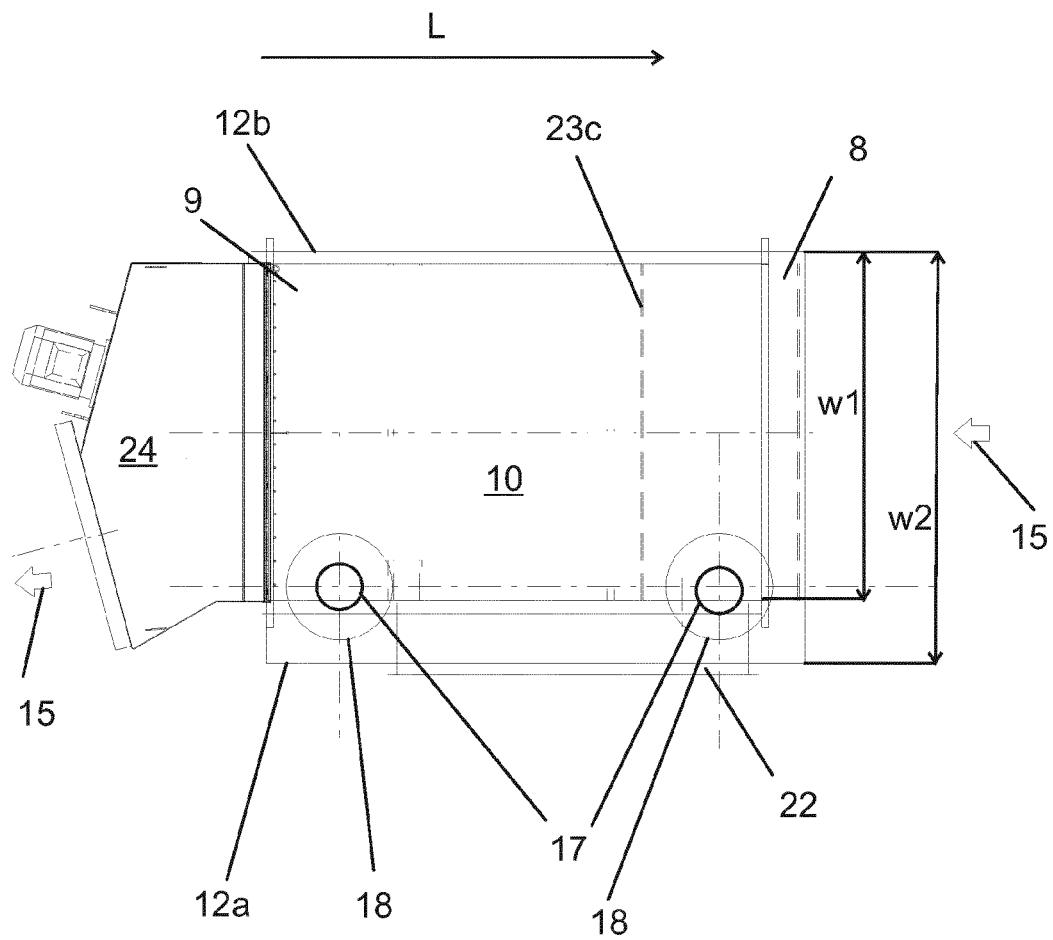
FIG. 3 shows a top view of the heat exchanger connected to an electrical machine.

FIG. 3 illustrates a top view of the heat exchanger. The circles in the FIG. 3 represent a cooling fluid circulating devices 5 in the mounting spots 17. Two cooling fluid circulating devices 5 are located one after the other in the length direction of the heat exchanger L. The cooling fluid circulating devices 5 are in the same half of the heat exchanger 1 in the direction of the width of the heat exchanger w.

The heat exchanger 1 and an external fan unit 24 for transferring an external cooling fluid 15 in the plurality of tubes 7 form a cooling unit of the electrical machine 2. In the Figures the flow direction of the external cooling fluid 15 is from the first end of the heat exchanger 8 to the second end 9, where the first end corresponds the drive end side of the electrical machine 2 and the second end corresponds the non-drive end of the electrical machine 2. The external fan unit 24 is located adjacent to the second end 9 of the heat exchanger 1. However, the flow direction of the external cooling fluid 15 may be also from the second end 9 of the heat exchanger 1 to the first end 8 of the heat exchanger 1, and the external fan unit 24 may located adjacent to the first 8 or second end 9 of the heat exchanger 1.

The horizontal baffle 23c above one mounting spot 17 is shown with a dotted line.

The electrical machine 2 in the figures is a wind turbine generator, which can be placed in a nacelle of a wind turbine to convert mechanical power into electricity.

In the Figures the external cooling fluid 15 is a gas, e.g. air. If the external cooling fluid 15 flowing in the tube bundle is liquid then the cooling unit comprises an external pump unit for transferring an external cooling fluid 15 in the plurality of tubes 7. With a liquid as an external cooling fluid 15 it is preferred that the plurality of tubes 7 comprise double tubes where a primary tube is inserted in a secondary tube. If the primary tube starts leaking the leaking external cooling fluid 15 flows between the primary and secondary tubes into a leakage collection space and the leakage is kept separate from the cooling fluid flowing in the housing.

In the method for manufacturing a heat exchanger 1 for an electrical machine 2 a heat exchanger housing 6 comprising a top wall 10, end walls 11a-b extending in the direction of the width of the heat exchanger w and side walls 12a-b extending in the direction of the length of the heat exchanger L and a bottom frame 13 is manufactured. A tube bundle 3 comprising a plurality of tubes 7 is manufactured. The plurality of tubes 7 is arranged within the housing 6 to extend between a first end 8 and a second end 9 of the housing 6 in the direction of the length of the heat exchanger L. Between a first side wall 12a of the housing 6 and a side of the tube bundle 16 is arranged a mounting space 4 for receiving one or more cooling fluid circulating devices 5.

The heat exchanger 1 for an electrical machine 2 is flat as the cooling fluid circulating devices 5 are located within the housing 6. The maintenance and possible replacement of the cooling fluid circulating devices 5 can be made from the side 12a of the heat exchanger 1. As there is no need to lift up the cooling fluid circulating devices 5 during the maintenance the required free height above the heat exchanger 1 is minimized. The heat exchanger 1 is suitable to be installed in the nacelle of a wind turbine, for instance. The heat exchanger 1 is suitable for other applications requiring compact size from a cooling unit and its heat exchangers 1.

The heat exchanger 1 comprises two cooling fluid circulating devices 5 located one after the other in the length direction of the heat exchanger L in the same half of the heat exchanger in the direction of the width of the heat exchanger w.

It will be obvious to a person skilled in the art that, as the technology advances, the inventive concept can be implemented in various ways. The invention and its embodiments are not limited to the examples described above but may vary within the scope of the claims.

Part list: 1 a heat exchanger, 2 an electrical machine, 3 a tube bundle, 4 a mounting space, 5 a cooling fluid circulating device, 6 a housing, 7 a plurality of tubes, 8 a first end, 9 a second end, 10 a top wall, 11a a first end wall, 11b a second end wall, 12a a first side wall, 12b a second side wall, 13 a bottom frame, 14 a cooling fluid flow, 15 an external cooling fluid flow, 16 a side of the tube bundle, 17 a mounting spot, 18 fan, 19 a fan wheel, 20 a fan motor, 21 a frame of an electrical machine, 22 a terminal box, 23a-c a baffle, 24 an external fan unit.

h1 an internal height of the housing, h2 a height of the tube bundle, L a the length of the heat exchanger, w a width of the heat exchanger, w1 width of the housing at the bottom frame, w2 width of a housing, w3 width of a tube bundle, y vertical direction.

The invention claimed is:

1. A heat exchanger for an electrical machine, where the heat exchanger comprises
a housing and a tube bundle, the tub bundle comprising a plurality of tubes within the housing extending between a first end and a second end of the housing in the direction of the length of the heat exchanger, the housing comprises a top wall, end walls extending in the direction of the width of the heat exchanger and first and second side extending in the direction of the length of the heat exchanger and a bottom frame, wherein between a first side wall of the housing and a side of the tube bundle within the housing is a mounting space extending from the first end to the second end of the housing, a first fan being positioned in the mounting space adjacent to the first end of the housing and a second fan being positioned in the mounting space adjacent to the second end of the housing,
wherein the heat exchanger is installed on the top of an electrical machine and is attached to a frame of the electrical machine by means of the bottom frame.

2. The heat exchanger for an electrical machine according to claim 1, wherein the fan comprises a fan motor and a fan wheel.

3. The heat exchanger for an electrical machine according to claim 2, wherein the fan is mounted in the mounting space where the fan wheel of the fan is positioned above the fan motor in the vertical direction.

4. The heat exchanger for an electrical machine according to claim 3, wherein an inlet of the fan wheel is above the plurality of the tubes in the vertical direction.

5. The heat exchanger for an electrical machine according to claim 2, wherein the heat exchanger comprises baffles spaced at a distance apart from each other in the length direction of the heat exchanger, wherein at least two of the baffles are inlet baffles located between the fans forming a cooling fluid inlet flow channel in a vertical direction of the heat exchanger.

6. The heat exchanger for an electrical machine according to claim 5, wherein at least two outlet baffles are located on the sides of the fans facing the first and second end of the heat exchanger, and the at least two inlet and outlet baffles form cooling fluid outlet flow channels in the vertical direction of the heat exchanger.

7. The heat exchanger for an electrical machine according to claim 6, wherein the fan is configured to suck cooling fluid through the cooling fluid inlet flow channel formed in the middle part of the heat exchanger and to blow the cooling fluid through the cooling fluid outlet flow channels formed at the first end part region and the second end part region of the heat exchanger.

8. The heat exchanger for an electrical machine according to claim 2, wherein the outlet of the fan is configured to blow the cooling fluid towards the tube bundle in the width direction of the tube bundle.

9. The heat exchanger for an electrical machine according to claim 1, wherein the height of the tube bundle is 50-80% of the internal height of the housing in vertical direction.

10. The heat exchanger for an electrical machine according to claim 1, wherein the width of the tube bundle is wider in the region closer to the bottom frame than the width of the tube bundle in a region closer to the top wall.

11. The heat exchanger for an electrical machine according to claim 1, wherein the tube bundle extends to the first side wall below a vertically lower part of the mounting space in the width direction.

12. The heat exchanger for an electrical machine according to claim 1, wherein the width of the housing is 5-25% greater in the top wall region than the width of the housing in the bottom frame region.

13. The heat exchanger for an electrical machine according to claim 1, wherein the plurality of tubes comprise double tubes where a primary tube is inserted in a secondary tube.

14. A cooling unit of an electrical machine comprising a heat exchanger according to claim 1, wherein the heat exchanger comprises an external fan unit for transferring an external cooling fluid in the plurality of tubes.

15. An electrical machine according to claim 1, wherein the electrical machine comprises a side mounted terminal box on a frame of the electrical machine, and the terminal box and the first side wall of the heat exchanger are on the same side of the assembly of heat exchanger and the electrical machine.

16. The electrical machine according to claim 1, wherein the electrical machine comprises a wind turbine generator.

17. A wind turbine comprising an electrical machine according to claim 1.

18. A heat exchanger for an electrical machine, where the heat exchanger comprises
- a housing and a tube bundle, the tub bundle comprising a plurality of tubes within the housing extending between a first end and a second end of the housing in the direction of the length of the heat exchanger, the housing comprises a top wall, end walls extending in the direction of the width of the heat exchanger and first and second side extending in the direction of the length of the heat exchanger and a bottom frame, wherein between a first side wall of the housing and a side of the tube bundle within the housing is a mounting space extending from the first end to the second end of the housing, a first fan being positioned in the mounting space adjacent to the first end of the housing and a second fan being positioned in the mounting space adjacent to the second end of the housing,
- wherein the fan comprises a fan motor and a fan wheel,
- wherein the fan is mounted in the mounting space where the fan wheel of the fan is positioned above the fan motor in the vertical direction, and
- wherein the heat exchanger comprises baffles spaced at a distance apart from each other in the length direction of the heat exchanger, wherein at least two of the baffles are inlet baffles located between the fans forming a cooling fluid inlet flow channel in the vertical direction of the heat exchanger.

19. A heat exchanger for an electrical machine, where the heat exchanger comprises
- a housing and a tube bundle, the tub bundle comprising a plurality of tubes within the housing extending between a first end and a second end of the housing in the direction of the length of the heat exchanger, the housing comprises a top wall, end walls extending in the direction of the width of the heat exchanger and first and second side extending in the direction of the length of the heat exchanger and a bottom frame, wherein between a first side wall of the housing and a side of the tube bundle within the housing is a mounting space extending from the first end to the second end of the housing, a first fan being positioned in the mounting space adjacent to the first end of the housing and a second fan being positioned in the mounting space adjacent to the second end of the housing,
- wherein the fan comprises a fan motor and a fan wheel,
- wherein the fan is mounted in the mounting space where the fan wheel of the fan is positioned above the fan motor in the vertical direction,
- wherein an inlet of the fan wheel is above the plurality of the tubes in the vertical direction, and
- wherein the heat exchanger comprises baffles spaced at a distance apart from each other in the length direction of the heat exchanger, wherein at least two of the baffles are inlet baffles located between the fans forming a cooling fluid inlet flow channel in the vertical direction of the heat exchanger.

* * * * *